United States Patent [19]
Milles

[11] Patent Number: 5,804,154
[45] Date of Patent: Sep. 8, 1998

[54] PROCESS FOR THE PRODUCTION OF A SILICA-SUBSTANCE CONTAINING MATERIALS AND MATERIALS PRODUCED THEREFROM

[76] Inventor: Victor Alexander Milles, Wilfriedstrasse 2, 8032 Zürich, Switzerland

[21] Appl. No.: 284,413

[22] PCT Filed: Nov. 26, 1993

[86] PCT No.: PCT/CH93/00269

§ 371 Date: Aug. 2, 1994

§ 102(e) Date: Aug. 2, 1994

[87] PCT Pub. No.: WO94/13597

PCT Pub. Date: Jun. 23, 1994

[30] Foreign Application Priority Data

Dec. 9, 1992 [CH] Switzerland ............................ 3763/92

[51] Int. Cl.⁶ .................................................. C01B 33/12
[52] U.S. Cl. ...................... 423/338; 501/12; 252/315.01; 106/600; 106/819
[58] Field of Search ............................... 501/12; 423/338; 252/315.01; 106/600, 819

[56] References Cited

U.S. PATENT DOCUMENTS

| | | | |
|---|---|---|---|
| 4,097,422 | 6/1978 | Markusch | 260/2.5 AK |
| 4,948,765 | 8/1990 | Snook | 501/127 |
| 5,132,355 | 7/1992 | Nahlovsky | 524/474 |
| 5,571,319 | 11/1996 | Berke et al. | 106/823 |

FOREIGN PATENT DOCUMENTS

| | | |
|---|---|---|
| 0 495 336 | 7/1992 | European Pat. Off. . |
| 0 478 864 A2 | 8/1992 | European Pat. Off. . |
| 41 04 596 | 8/1992 | Germany . |
| 403230 | 12/1933 | United Kingdom . |

OTHER PUBLICATIONS

Zement Taschenbuch, Verein Deutscher Zementwerke, pp. 56–57 and 250–251 (1979) (No month available).

*Primary Examiner*—Paul Marcantoni
*Attorney, Agent, or Firm*—Karen Lee Orzechowski; Walter C. Farley; Nath & Associates

[57] ABSTRACT

Colloidal compositions based on fillers, sol oxides, poly silicates, and, optionally, pigmenting agents, and their method of production the solid disperse phase not only operates to cross-link but also as an overmatrix incorporating macroparticles therein. The dispersant is finally chemically set with excess setting agent so that the preliminary product can be finalized to the desired material. For this purpose a matrix-like substance of filler-like macroparticles and sol oxide (crosslinling substance) and a buffer are brought together for assisting the formation of the overmatrix and are processed. This substance is pigmentable by introducing a variation mixture into the substance, so that a wide range of characteristics can be obtained. The substance directed at the desired material, namely a hydration and balancing process stage and a subsequent setting and stabilizing process stage.

29 Claims, No Drawings

PROCESS FOR THE PRODUCTION OF A SILICA-SUBSTANCE CONTAINING MATERIALS AND MATERIALS PRODUCED THEREFROM

FIELD OF THE INVENTION

The present invention relates to the field of mineral materials and more particularly to compositions based on fillers, sol oxides, polysilicates and, optionally, pigmenting agents and their method of production.

BACKGROUND OF THE INVENTION

Numerous materials with which specific problems could be solved are known from colloid chemistry, particularly sol-gel technology. Colloids are usually defined as disperse systems with at least one characteristic dimension in the range of about $10^{-7}$ to $10^{-4}$ centimeters. Sols are dispersions of any solid in a liquid. Gels, are systems, such as common jelly, in which one component provides a sufficient structural framework for rigidity and other components from the space between the structural units or spaces. In a gel, the dispersed component and the dispersion medium both extend continuously throughout the system. The system has equilibrium-elastic (time-dependent) deformation and thus the shear modulus of rigidity enables gels to act like solids even though in most other physical respects they behave like liquids. Therefore, it is possible to produce from liquid components a solid, crosslinked material.

Whereas as in the case of conventional dispersions, a sol, e.g. the disperse phase, is relatively freely movable, this is no longer the case in a gel, where the particles are interconnected in net-like manner and are therefore difficult to displace relative to one another. Thus, the essence of sol-gel technology is the transition between free disperse and crosslinked dispersed phase. As a rule the transition from sol to gel in materials is irreversible, the dispersed, solid constituent being distributed in net or honeycomb-like manner in the dispersant, usually water, the dispersant being expelled by means of heat, in order to give a solid crosslinked material.

What is problematical is the finalization of the gel to the material, i.e. the expulsion of the dispersant. It would be desirable to obviate this procedure, i.e. to essentially incorporate the dispersant into the material. Advantageously this should take place without additional process stages and certainly not by means of energy-intensive stages such as burning out, baking, etc.

SUMMARY OF THE INVENTION

The presently described process for the production of inorganic modified oxides by which hard and solid, crosslinked, layer-like, transparent or crystalline multicomponent semifinished products or materials can be produced at low temperature such as e.g. ambient temperature, constitutes a further, enrichment of the prior art in this field.

DESCRIPTION OF THE PREFERRED EMBODIMENTS

The invention defined in the claims shows how it is possible to arrive at semifinished products further processable to such materials. This leads to universally usable, inorganic materials, which can be produced in large quantities.

The fundamental idea is based on the fact that the object is not merely the crosslinking of the solid disperse phase in the dispersant, but also the use of the solid disperse phase as an overmatrix, in order to incorporate macroparticles into the same, the dispersant in the material being finally chemically bound, but sufficient binding agent is added in excess that with a subsequent dispersant addition the preliminary product can be finalized to the desired material. This leads to a storable, but still reactive semifinished product which, mixed with the dispersant (generally water) and finally reacted leads to the end product.

For this purpose a matrix-like substance of filler-like macro-particles and sol oxide, polysilicate (crosslinking materials) and a buffer for assisting the formation of the overmatrix are brought together and processed. In a further embodiment of the present invention, this substance is pigmentable, thus allowing a considerable variety of characteristics to be attained. This is brought about by introducing a variation mixture into the substance. The varied substance directed at the sought objective is transformed in two following process stages into the desired semifinished product, namely a hydration and balancing stage and a following setting and stabilization stage. The still reactive, stabilized semifinished product can be reacted at a later time to a finished material by mixing it with dispersant, so that the final reaction occurs. This takes place at low temperatures (below 150° C. and most frequently below 100° C.).

Hereinafter by means of a first qualitative basic example the principle is discussed in greater detail and then by means of a quantitative basic example the principle can be implemented and subsequently in accordance with the above grouping substances are discussed which are suitable for producing such materials and in conclusion a few examples are given based on actual experiments.

THE QUANTITATIVE BASIC EXAMPLE

Component A: (filler part) comprises the fillers such as e.g. glassmaking sand (cullet), optionally mixed with tough fibers (carbon fibers, Kevlar, rock wool, glass fibers, etc.). As a function of the material to be obtained, these particles are of varying size, but are clearly a multiple above the colloid limit of the dispersion used for the overmatrix.

Component B: (reaction part) includes an acid part, alone or together with the sol oxide, such as e.g. silica sol, aluminum sol, titanium sol, zirconium sol, etc., the sols having a maximum oxide content. In order to obtain a more reactive end product, solid acids, e.g. boric acid are added. Concentrated o-phosphoric acid serves as the acid reaction medium and with a proportion of unsoiled oxide, e.g. Si-oxide (fumed silica, Aerosil) is added to the silica sol, so as to increase the sol oxide content. The soiling on acts as a gelling delay means for better storage stability. Component B can also contain pigmenting or dyeing agents (component B'), particularly those consisting of two components, one being introduced here and the other into component V.

Component C: (buffer part) formed by a mixture of sol oxide and a polysilicate, e.g. in a ratio of 1:1, which is provided with 1% of a metal oxide (Al, Ti, Zr, etc.) as an agglomeration or lumping preventing agent. Here a type of solling on is sought. The polysilicate is a highly alkaline acting component.

The filler (component A), reaction part (component B) and buffer part (component C) form the substance (ABC) for further variations of the end product. A variation mixture added to the substance is prepared in the following way:

Component V: (variation part) prepared from one or more of the premixes indicated below. It contains pigmenting agents in the form of metal salts such as aluminum, iron, copper, chromium salts, etc. This addition either takes place separately by a variation mixture to the substance or by additions to component B.

Premix V1: e.g. a sol oxide-related substance, e.g. potassium silicate or trisilicate and a metal oxide, e.g. of Al, Si, Ti or Zr with boric acid. Hydroxides, preferably zirconium hydroxide, as well as calcium hydroxide or cements (and boric acid) can be used.

Variation mixture: The two premixes V1 and V2 are mixed together for preparing component V and (optionally once again a solid acid, e.g. boric acid is added), a hydroxide such as Zi-hydroxide, Ca-hydroxide, etc., in this case e.g. zirconium hydroxide is added and intimately mixed with one another and well homogenized. This gives a colourless, slightly coloured or coloured mixtures, which can be introduced into the substance for the sought objectives. The variation mixture is prepared as a function of the filler.

The three components A, B and C are mixed together in the following way to a substance and varied with component V.

Formation of the Substance

Component A is completely wetted with component B or B', so that a consistency of wet sand is obtained. In the case of additions for obtaining a pigmented component B, it is necessary to provide a residence time in which colouring takes place or the chemical reaction leading to the latter. Without the acid addition in B the colour reaction does not occur. Following the necessary residence time, where the wet sand consistency is retained, component C is added, being poured into the "wet sand" and intimately mixed. In order to avoid agglomeration or lump formation the mixture can be passed through a sieve or screen. The consistency remains similar to a wet powder, but tends to gel, i.e. to form the overmatrix, but is still free-flowing and should be further processed as rapidly as possible.

Variation of the Substance

The resulting wet, free-flowing substance is mixed with the variation mixture, so that an almost dry powder is obtained. The variation mixture contains components for binding in the dispersant. The resulting powder is preferably screened in order to comminute any lumps and homogenize the mixture. The resulting mixture is allowed to stand for roughly 1 to 5 hours/n. The powder becomes ever drier through the binding in of dispersant (waters binding time, hydration). The resulting dry, pulverulent mixture with different particle sizes is still not stable in storage and should be further processed within a reasonable time. The dispersant incorporation must be continued and finalized.

Hydration and Balancing

The varied substance is "started" with a hydrating agent (starter substance), e.g. metasilicate (hydration). This takes place by intimate mixing, the mixture becoming detectably warm. During mixing further sol oxide with polysilicate is poured in (balancing). The mixing process is continued until a dry powder is obtained. The heating level increases on pouring in the sol oxide and polysilicate. The metasilicate probably serves was a water binder (hydration). Following this process an ever drier powder is obtained, but it is still not stable in storage.

Setting and Stabilization

The aim is to produce a still reactive, stable product. The next stages initiate the stabilization phase. Thus, the resulting powder is further processed. The now dry powder contains residues of bound water, which is hydrated by mixing further metasilicate. On mixing in the metasilicate heat evolution occurs and the powder becomes increasingly moist and sticky. Before it again acquires a dry, pulverulent consistency, addition takes place of hydroxylizing (setting, possibly catalyzing) substances, e.g. hydroxides of Ca, Al, Mg, Zr, etc. and vigorous mixing occurs until a uniform granular material is obtained. Thus, the stable, reactive end product with a hydrating agent excess is obtained, which ins a subsequent stage can be reacted to a corresponding material on adding dispersant. The finalizing stages could naturally take place at this point, if this material is required. However, the aim is e.g. that a semi-finished product in granular form can e.g. be stirred with water, randomly applied and then cured at ambient temperature e.g. to form a layer, a block, calendared plates, and the like.

The Quantitative Basic Example

Component A: 300 g of glassmaking sand (cullet), optionally with tough fibers (carbon fibers, Kevlar, rock wool, glass fibers, etc.).

Component B: 25 g of a mixture of 100 g of silica sol(e.g. Levasol 200/40% from Bayer-Leverkusen) or a sol oxide such as Si-oxide sol;, Al-oxide sol, ti-oxide sol, Zi-oxide sol, etc. (in part not commercially available), but in this case silica sol (Si-oxide sol) preferably 50% or higher in the silica content, are mixed with 5 g of concentrated o-phosphoric acid in a ratio of 100:30 g of boric acid. The boric add is added for buffering and in part having a gelling accelerating action. It is also possible to use other buffers such as aluminum oxide, zirconium oxide (Degussa) or other oxides. Gelling delay takes place if no boric acid is added.

Component C: 25 g of a mixture of sol oxide (in this case 40% silica sol, 50% silica sol leading to a sedimentation of the mixture) with 40% lithium polysilicate (Van Baerle, Munchenstein BL, Switzerland) in a ratio of 1:L1 and which can additionally be provided with 0.5 to 1% of an oxide (Al, Ti, Zr, etc.) as an agglomeration preventing agent.

Premix V1: 100 g of potassium silicate or trisilicate and 5 g of Al-oxide, 10 g of boric acid (or Zi-hydroxide (MEL)magnesium electrode Ltd., Manchester, GB), Ca-hydroxide) are mixed together, optionally with the addition of pigment in the form of inorganic pigments (spinel, lapis lazuli, e.g. from Van Baerle, etc.) or metal salts of aluminum, iron, copper, chromium, cobalt, manganese, etc.

Premix V2: 50 g of 50% silica sol from a mixture of 100:5 g of o-phosphoric acid are mixed together in a ratio 100:30 g of boric acid.

Component V: The two premixes V1 and V2 are mixed together, completely dried and again intimately mixed and well homogenized and mixed with 10 to 20 g of a carbonate, such as Ca-carbonate, zirconium carbonate (MEL), etc., or a hydroxide such as Ca-hydroxide, zirconium hydroxide, etc.) and once again well mixed.

The three component A, B and C are mixed together in the following way to a substance.

300 g of component A are completely wetted with 25 g of component B or B', so as to give a consistency like wet sand. With respect to component B a residence time must be respected, where colouring or the chemical reaction leading to this takes place. The colour reaction does not occur without acid addition in B'. Following the necessary residence time, when the wet sand consistency is maintained, 25 g of component C are added. It is poured into the "wet sand" and intimately mixed. To avoid lump formation the mixture can be passed through a sieve or screen. The consistency remains similar to a wet powder, but has a gelling tendency, but still flows freely and must be further processed.

The resulting 350 g of wet, free-flowing mixture of A, B and C are mixed with component V (80 g of dry powder), so that an almost dry powder is obtained. Preferably the resulting powder is screened in order to comminute any lumps and homogenize the mixture. The resulting 430 g of mixture are allowed to stand for approximately 1 to hours/n. The powder becomes ever drier (water binding time, hydration). The resulting dry, pulverulent mixture with different particle sizes is not stable in storage and must be further processed as soon as possible.

The 430 g of the above-prepared mixture are mixed with 20 g of powder-like Na-metasilicate and therefore reacted. This takes place by intimate mixing, the mixture becoming detectably warm. During mixing successively 50 g of sol oxide polysilicate (lithium polysilicate) are poured in in a ratio of 3:1 (balancing agent). The mixing process is continued until a dry powder is obtained. The heating level increases on pouring in the sol oxide. The metasilicate probably serves as a water binder (hydration). There are 500 g of a dry powder after this operation. In order to obtain a free-flowing particle mixture, the quantity obtained is again forced through a sieve before further processing.

The resulting 500 g of the mixture are further processed in the following way. The dry powder contains bound water, which is further hydrated by mixing in a further 20 g of metasilicate. On mixing in the metasilicate heat evolution occurs and the powder becomes increasingly moist and sticky. Before it is gain passed into a dry, pulverulent consistency, addition takes place of 50 to 60 g of a hydroxylizing substance, e.g. hydroxides and/or carbonates or hydrocarbonates of Ca, Al, Mg, Zr, etc. or a combination of hydroxylizing substances with a cement, followed by vigorous mixing until a uniform granular material is obtained. Thus, approximately 600 g of end product are obtained.

The end product is storable, but must be protected against moisture. As a function of pigmentation different coloured granules are obtained and as a function of the basic substance, i.e. quartz sand, glass powder, etc., they are either more glittering or more dull. Said granules can be stirred with water. The resultant mixture has a consistency ranging from doughy to free-flowing, the resultant mixture to be spread on a surface, spatula-applied to a surface, calendared, poured or sprayed. When applied to a surface such as glass, metal, ceramic, concrete or wood, the material adheres and reacts in air at ambient temperature to a dry, hard, mineral feeling layer. The completely reacted product is waterproof, tough, hard, resistant to most mechanical actions and can also be used as rock glue or as an inorganic adhesive. The range of uses is virtually unlimited.

The various additions of solid and liquid silicates combined with metal oxides and hydroxides lead to different effects, e.g.:

Aluminum oxide: tends to make layers brittle with a tendency shrinkage cracks, crosslinking to conglomerates, coarse surface;

Titanium oxide: differs by a pigmentation and more homogeneous combination, leads to brittleness and hard layers, crosslinking to conglomerates and with an average coarse surface;

Silicon dioxide: delays the reaction process, but least to more homogeneous layers;

Zirconium oxide: less shrinkage cracks and good balance between pH and crystallization, slight pigmentation.

The above phenomena were observed during variation experiments and are to be looked upon purely empirically.

The Groups

Substance Components

A Borosilicate glass, glassmaking sand, foundry sand, mineral sands, borosilicate, organic and inorganic fibrous material, quartz sand, aluminum oxide (white corundum).

B Phosphoric acids, boric acid and optionally sol oxides such as silicon dioxide sol (silica sol), aluminum oxide sol, titanium oxide sol, zirconium oxide sol and their dry oxides for solling on, zirconium acetate, kaolin.

C Sol oxides and sol oxides dissolved in alkali metal hydroxides, polysilicates (soda water glass, potassium water glass) and lithium polysilicate.

Variation of the Substance (With Component V)

Sodium silicate, potassium silicate, Ca-hydrocarbonate, zirconium carbonate, titanium carbonate or their hydroxides and the oxides of silicon, aluminum, titanium, zirconium mixed together. For pigmenting inorganic or mineral pigments or pigmenting agents such as metal salts, e.g. aluminum, iron, copper, chromium salts and sulphates, nitrates, hydroxides, etc.

Premixes (Some Examples)

Premix V1: 100 g of potassium silicate and 10 g of boric acid are mixed together→ dry premix.

Premix V2: In each case 5 g of an oxide of zirconium, aluminum, titanium, silicon, etc., or in each case 2.5 to 5 g of two different oxides indicated above are mixed together and added to V1) ->dry premix.

Premix V3: 100 g of basic 40% silica sol (e.g. Levasil, Bayer-Leverkusen) mixed with 5 to 10 g of phosphoric and boric acid in a ratio 100:30. This mixture is less alkaline than V6 and is therefore suitable for fillers with a lower alkali resistance such as e.g. glass sand ->wet and acid premix.

Premix V4: 100 g of basic 40% silica sol mixed with 5 g of phosphoric acid gives a combination in the acid range which is advantageous for delaying gelling ->wet and add premix.

Premix V5: 50 g of a mixture of 3 parts of basic 40% silica sol and 1 part of lithium polysilicate (used as a buffer for the premix of V3 and V4) ->wet, basic premix.

Premix V6: 200 g of 40% silica sol mixed with 5 g of Al-oxide and 10 g of Ca-hydrocarbonate, said mixture being alkaline and suitable for certain mineral fillers, but unsuitable for glassmaking sand ->wet, basic premix.

Premix V7: 10 to 20 g of Ca-hydroxide (Zi-hydroxide) are added to the combinable premixes V1 to V5 in the dry state and intimately mixed ->dry premix.

Premix V8: 100 g of potassium trisilicate with 10 g of zirconium hydroxide, 50 g of basic 40% silica sol mixed with 5 g of o-phosphoric acid are intimately mixed and dried for 8 to 12 hours and to avoid lump formation pass through a fine sieve. This powder is mixed with 100 g of water and up to 50 g powder ->dry premix. The aqueous dispersing solution is constituted by the premix V8 as a coating and film-forming pore sealer in materials produced form silica substances.

These premixes are used individually as component V or, as in the above-discussed example, used mixed together as a component V. These mixtures are used as a basis for the variation system of the still reactive preliminary product (granular material stirrable with dispersants) in order to give materials with desired characteristics, such as surface characteristics, hardness, colour, etc. Among carbon dioxide forming agents importance is attached to carbonates and hydrocarbonates e.g. of calcium or zirconium. In the case of carbonates carbon dioxide is released in the reaction with the premixes V3 and V4 and consequently a better "crosslinldng" is obtained. In place of basic silica sols it is also possible to use acid silica sols. The basic silica sols used contain a higher Si-concentration (up to 50% Si) than the basic silica sols (up to approximately 30% Si).

Premixes V5 and V6 are also used as balancing agents, which can be added to the mixture ABCV with metasilicate (hydrating agent) after or during reaction.

Hydrating and Balancing

Metasilicates such as e.g. potassium metasilicate, sodium metasilicate as hydrating agents and premixes V5 or V6 or the like (see examples) as balancing agents.

Setting and Stabilizing

Metasilicates (as above), hydrocarbonates or hydroxide such as calcium hydroxide, magnesium hydroxide, aluminum hydroxide, titanium hydroxide, zirconium hydroxide, further hydrating products such as white cement, Portland cement, or a combination of cements and hydroxides or novel hydrating products, which are specifically modified in view of the desired mineral composition, e.g. with a combination of clinker minerals.

Quantitative Variations for the Basic Examples

Example I: hydroxide example

Component A: 300 g of borosilicate glassmaldng sand (Berger & Bachmann, Buchs AG, Switzerland).

Component B: 5 g of a mixture of 100 g of 40% silica sol (Levasil) with 5 g of o-phosphoric acid in a ratio of 100:10 g of boric acid.

Component C: 25 g of a mixture of 100 g of 40% silica sol in a ratio of 1:1 with 40% lithium polysilicate (Van Baerle, Munchenstein, BL, Switzerland).

Premix: formed from premixes V1, V2 and V3 comprising 75 g of a powder mix of 100 g of potassium trisilicate (Van Baerle), 5 g of zirconium oxide (MEL) and 10 g of boric acid, as well as 50 g of a mixture of 100 g of 40% silica sol with 5 g of a mixture of phosphoric acid 100:10 g with boric acid (component B) and dried for approximately 8 to 12 hours at ambient temperature.

Premix V7: 10 to 20 g with in each case 10 g of Ca-hydroxide (10 g zirconium hydroxide—MEL) are mixed with the above premix (V1, V2 and V3).

Component V: 70 to 80 g of the two premixes V1–V3 and V7 are mixed together and well homogenized (e.g. through a hair sieve).

Components A, B and C are mixed together in the following way:

300 g of component A are completely wetted with 5 g of component B, so that a wet sand consistency is obtained. 25 g of component C is poured into the "wet sand" and intimately mixed. Following the mixing process the product has a gelling tendency and consequently becomes free-flowing, but still remains moist.

The resulting 330 g of the moist, free-flowing mixture ABC are mixed with component V (80 g of dry powder), so that an almost dry powder is obtained. In order to homogenize the mixture and comminute any lumps, the product is forced through a sieve. The resulting 410 g of mixture are allowed to stand for between 1 and 2 hours. The powder is hydrated by the water binding time to a granular powder mixture, which is further processed (not storage-stable).

The 410 g of the above-prepared mixture are mixed with 20 g of Na-metasilicate. This takes place by intimate mixing, the mixture becoming somewhat sticky and moist. During mixing successive pouring in takes place of 50 g of a mixture of 200 g of 40% silica sol and 5 g of aluminum oxide and 10 g of Ca-hydrocarbonate (V6 as the balancing agent). During the pouring in of the sol oxide the metasilicate reacts as a water binder and hydrates the 480 g slowly for approximately 1 to 5 hours so as to give a granular sand with different particle sizes. If at the end of the setting time the mixture has a lump formation tendency and a tendency to produce free-flowing granules, the product is again passed through a sieve.

The resulting 480 g of mixture are further processed in the following way. The dry granular product contains bound water, which is further hydrated by mixing in a further 20 g of Na-metasilicate. This gives a moist and tacky state and addition takes place of a hydroxylizing (catalyzing) substance. Substitute for new hydration products, with the following proportions: Tricalcium silicate [(3 CaO, $SiO_2$, $Al_2O_3$ ($C_3A$)], dicalcium silicate [(2 CaO, $SiO_2$ ($C_2S$)], tricalcium aluminate [(3 CaO, $Al_2O_3$, $Fe_2O_3$)], calcium sulphate hydrate [($CaSO_4$ $2H_2O$ ($C_4AF$)] and calcium oxide (CaO) formulated for specific material modifications, can be added in place of 50 to 70 g of white cement combined with Ca-carbonates, Ca-hydroxides, kaolin, etc. and vigorous mixing then leads to a uniform granular product of approximately 570 g.

The end product is a chemically modified mixture, which is stepwise prevented from reacting and is subsequently transformed stepwise into different aggregate states as a basic material until an irreversible chemical process mechanism is ended. As a basic material and starting substance prior to processing, the end product can be stored, but must be protected against moisture. As a function of the pigmentation, the granules have different colours and as a function of the basic substance (i.e. quartz sand, glassmaking or other mineral sands) they are more brilliant or dull. These granules can be stirred or mixed with water. As a function of the doughy to free-flowing consistency the substance can be calendared, spatula-applied, poured or sprayed. When poured or otherwise applied to a surface such as glass, metal, ceramic, concrete, wood or plastic, the material adheres and reacts with the atmospheric carbon dioxide and the substrate by silification, during which a more or less pronounced crystalline structure is obtained. The completely reacted product is waterproof, tough, hard, resistant to most mechanical actions and can also be used as a rock glue or inorganic adhesive. The range of uses is virtually unlimited.

Example II (formulation only): (carbonate example)

Component A: 300 g of glassmaldng sand (Berger & Bachmann)

Component B: 5 g of 40% silica sol with 5 g of phosphoric acid in the ratio 100:10 g of boric acid Component C: 25 g of 40% silica sol 1:1 lithium polysilicate (Van Baerle)

Component F: 80 to 90 g of 100 g potassium trisilicate with 2.5 g aluminum oxide and 10 g of boric acid mixed with 10 to 20 g of Ca-hydrocarbonate (corresponding to a mixture of premixes V1–V3 and V7)

Mixtures A, B, C, VP: To the 410 g obtained are added 20 g of Na-metasilicate (hydrating agent—Van Baerle) and 50 g of a mixture of 50 g of 40% silica sol in the ratio 3:1 lithium polysilicate (Van Baerle—V5 as balancing agent)

Stabilization: To the 460 g are added 20 g of Na-metasilicate and 60 to 80 g white cement (Dickenhoff, Germany). The combination of Ca-carbonate in component V with the cement as the reactant for the hydration, has an effect on the homogenization during the subsequent processing of the finished granular material to a product (i.e. on stirring the finished granules with dispersant, here water). The result is a granular material, which can be stored and mixed with water gives a sold material.

The addition and mixing in the case of Example II are substantially the same as in Example I. The following exemplified formulations are processed in the same way.

Example III (formulation only): (kaolin example)

Component A: 300 g of quartz sand (Zimmerli Mineralstoffe, Zurich, Switzerland)

Component B: 5 g of a mixture of 50 g of o-phosphoric acid with 5 g of aluminum oxide Component C: 50 g of a mixture of water 1:1 potassium trisilicate Component V: 85 g of a mixture of 100 g of potassium trisilicate with 5 g of Ti-oxide (Degussa), 10 g of boric acid, 50 g of 40% silica sol with 5 g of phosphoric acid in ratio 100 g:10 g of boric acid, dried for 1 to 5 hours, as well as 10 to 20 g of kaolin (Siegfried, Zofingen, Switzerland) added to the dry powder.

Mixture A, B, C, B: 20 g of Na-metasilicate to the 480 g of mixture, as hydrating agent for the further addition of 50 g of 40% silica sol inthe ratio 3:1 lithium polysilicate on the basis of 50 g of component C (V5 as balancing agent)

Stabilization: 20 g of Na-metasilicate for further wetting and crosslinking with 75 g of a mixture of 60 g white cement and 15 g Ca-hydroxide Granular material: 600 g as end product.

Example IV (formulation only)

Component A: 500 g of white corundum (e.g. for implantation medicine, Berger & Bachmann) (same volume as 300 g due to specific weight)

Component B: 5 g of o-phosphoric acid 100 g:5 g of aluminum oxide

Component C: 50 g of tricalcium silicate and water (in mixing ratio 1:1)

Component V: 135 g of a mixture of 75 g potassium trisilicate (Van Baerle) and 5 g of Al-oxide, 20 g of borosilicate glass powder, 10 g of boric acid, 10 g of Ca-carbonate, 15 g of Zi-hydroxide, and 20 g of sodium metasilicate Mixture A,B,C,V: 710 g of iller and powder proportion wetted with 50 g of a mixture of 200 g of 40% silica sol and 5 g of zi-oxide, 5 g of titanium oxide, 5 g of boric acid, and 5 g of kaolin and dried in air Stabilization: 15 g of Na-metasilicate for further wetting and crosslinking with 75 g of white cement Granular material: 850 g as end product.

Pigmentation to Basic Examples

Example V

Component A; 300 g of borosilicate glassmaking sand

Component B': 5 g of copper hydroxide carbonate (pigmenting agent, Sigfried, Zofingen, Switzerland)

Component B: 25 g of a mixture of 100 g of 40% silica sol with 5 g of o-phosphoric acid in the ratio 100:1 g of boric acid Component C: 25 g of a mixture of 100 g of 40% silica sol in a ratio 1:1 with 40% potassium water glass and 10% water addition as possible diluent Premix V: 85 g of a powder mixture of 100 g of potassium trisilicate with 5 g of zirconium oxide, 10 g of boric acid, 50 g of 40% silica sol with 2.5 g of o-phosphoric acid in the ratio 100:10 g of boric acid, which is dried for approximately 8 to 12 hours and subsequently intimately mixed with 10 g of hydrocarbonate (formed from premixes V1–V3 and V7).

Components A, B', B and C are mixed together in the following way.

300 g of component A are thoroughly mixed with 5 g of component B' and subsequently completely wetted with 25 g of component B, so that apart from a consistency like wet sand there is an optimum pigmentation and thorough colouring during the reaction phase with the aid and hydroxide carbonate. Following the mixing process 25 g of component C is poured into the wet, thoroughly coloured sand and again intimately mixed. the product has a gelling tendency and consequently becomes free-flowing, but remains moist.

The resulting 390 g of moist, free-flowing mixture AB'BC are mixed with 85 g of dry powder component V, so that an almost dry powder is obtained. To homogenize the mixture and comminute any lumps, the product is passed through a fine sieve. The resulting 475 g of mixture are allowed to stand for approximately 1 to 2 hours. The powder is hydrated by the water binding time to a granular powder mixture, which is further processed (not storage-stable).

The 475 g of the above mixture are mixed with 2 g of Na-metasilicate. This takes place by intimate mixing, so that the mixture becomes sticky and moist. During mixing successively 50 g of 100 g of 50% silica sol with a ratio of 100:30 g of lithium polysilicate (V5) are added. During the pouring in of the sol oxide polysilicate the metasilicate reacts as a water binder and hydrates the 545 g of product slowly for approximately 1 to 2 hours so as to give a granular sand with different particle sizes. After the setting time the mixture tends to agglomerate and must therefore be passed through a sieve again in order to produce free-flowing granules. The resulting 545 g of mixture are further processed in the following way. The dry granular product contains bound water, which is further hydrated by mixing a further 20 g of Na-metasilicate. This gives a moist, tacky state, to which are added 70 to 80 g of a mixture of white cement 100:10 g of kaolin. Accompanied by vigorous mixing and possibly again passing through a sieve, approximately 650 g of a uniform granular product are obtained.

Example VI (formulation only

Component A: 300 g of cristobalite sand (Berger, Mineralien-handel, Zurich, Switzerland)

Component B: 5 g of o-phosphoric acid and aluminum oxide with a mixing ratio of 100 g:5 g Component C: 25 g of 40% silica sol in a ratio of 1:1 to 40% potassium water glass Component V: 80 to 90 g of 100 g potassium trisilicate with 5 g of inorganic pigment (e.g. spinel, Bayer-Leverkusen), with 5 g of zirconium oxide and 10 g of boric acid as V1 and V2 combined with V4, namely 50 g of 40% silica sol in a ratio of 100:5 g of o-phosphoric acid with mixing and drying. Mixing also takes place with 10 g of Ca-carbonate according to V7

Mixture A,B,C,V: To the 430 g obtained are added 20 g of Na-metasilicate and V5 or 50 g of a mixture of 40% silica sol 100:30 g lithium polysilicate (V5)

Stabilization: To the 500 g obtained are added 20 g of Na-metasilicate and a mixture of 70 to 80 g of white cement in a ratio of 100:10 g of calcium hydroxide. The combination of Ca-hydroxide with the cement as the reactant for the hydration, has an effect on the homogenization during the subsequent processing of the finished granules to a material.

This leads to 600 g of granular material, which is storable and when stirred with water is compressed to a solid.

Example VII (formulation only):

Component A: 500 g of aluminum oxide (white corundum)

Component B: 10 g of a mixture of phosphoric acid, zirconium acetate, titanium oxide, zirconium oxide (mixing ratio 100:10:5:5 g)

Component C: 50 g of a mixture of 40% silica sol, potassium silicate, borosilicate glass powder and zirconium carbonate (mixing ratio 100:50:20:10 g) which in gel-powder form solidifies rapidly, so that when mixing corresponding precautions must be taken (see hereinafter)

Component V: 160 g of a mixture of potassium trisilicate, borosilicate glass powder, Ca-carbonate, boric acid, zirconium hydroxide (mixing ratio 100:25:10:10:15 g)

Mixture A,B,C,V: to the 720 g of mixture obtained are added for hydration and balancing purposes 20 g of Na-metasilicate and 50 g of a mixture of 40% silica sol, component B (see above) borosilicate glass powder, titanium oxide, zirconium oxide (mixing ration 100:10:25:5:5 g)

Stabilization: To the 790 g of mixture obtained are added 15 g of Na-metasilicate and 75 g of white cement.

880 g of granular product are obtained, which can be stored and is processed by adding dispersant to the finished silica substance.

Example VIII (formulation only):

Component A: 500 g of aluminum oxide (white corundum)

Component B: 5 g of a mixture of phosphoric acid and aluminum oxide (mixing ratio 50:5 g)

Component C: 50 g of a mixture of water, potassium trisilicate, aluminum oxide, borosilicate glass powder (mixing ratio 100:100:5:20 g), said gel-powder mixture solidifying rapidly, so that when mixing corresponding precautions must be taken (see hereinafter)

Component V: 175 g of a mixture of potassium trisilicate, aluminum oxide, Ca-hydrocarbonate, boric acid and zirconium hydroxide (mixing ratio 75:5:10:10:15 g)

Mixture A,B,C,V: The 710 g of mixture obtained are mixed for hydration and balancing purposes with 20 g of sodium metasilicate and 50 g of a mixture of 40% silica sol, component B (see above), boric acid, titanium oxide, zirconium oxide and kaolin (mixing ratio 100:5:5:5:5 g)

Stabilization: The 750 g of mixture obtained are mixed with 50 g of sodium metasilicate and 75 g of white cementer.

890 g of storable granular material are obtained and this is processed to the finished silica substance by adding dispersant.

As intimated hereinbefore, part of the mixture to be mixed is solidified during the mixing process, so that special mixing precautions must be taken. It is recommended that the mixtures be mixed rapidly and forced through a sieve in the not completely solidified state. It is also possible to use static mixers.

Carbonates reacting with acids bring about the gassing out of carbon dioxide in the mixture. The carbon dioxide from the ambient air and that in the mixture bring about the desired silification. Without carbon dioxide there is no good silification or crosslinking. There is optimum pigmentation in the case of low dosage and use of pigments. A complete thorough dyeing is obtained when glass fillers are used. The chemical composition also permits colouring such as in the case of gems,. e.g. lapis lazuli, turquoise, malachite and rhodonite. Thus, compared with the hitherto known mineral silicate materials particular significance must be attached to the value increase obtained setting new criteria as a refining and improving process.

The invention being thus described, it will be obvious that the same may be varied in many ways. Such variations are not to be regarded as a departure from the spirit and scope of the invention and all such modifications are intended to be included within the scope of the following claims.

I claim:

1. A process for the preparation of stable, reactive semi-finished product based on sol oxides, polysilicates and fillers for use in solid mineral materials, said process comprising the steps of:
    a) mixing together
        i) a filler component containing macroparticles having a size above the colloid limit of the particles in the sol-gel dispersion;
        ii) a reaction component containing an acid component, and
        iii) a buffer component containing sol oxides and polysilicates to form a first mixture;
    b) forming granulates by adding a first hydrating agent to said first mixture until substantially dry granulates are obtained; and
    c) setting and stabilizing said granulates by mixing said granulates with a second hydrating agent while maintaining an excess of said second hydrating agent to form said stable, reactive semifinished product.

2. The process of claim 1 wherein said filler component is selected from the group consisting of borosilicate glass, quartz glass, sand, aluminum oxide, and mixtures thereof.

3. The process of claim 1 wherein said filler component is selected from the group consisting of organic fibrous material, inorganic fibrous material, and mixtures thereof.

4. The process of claim 1 wherein said reaction component comprises sol oxide.

5. The process of claim 4 further comprising the step of delaying gelling, said step of delaying gelling comprising adding an unsoiled oxide to said silica sol to increase the sol-oxide content of the silica sol.

6. The process of claim 1 further comprising the step of adding a metal pigmenting salt to said first mixture.

7. The process of claim 6 wherein the metal salt is selected from the group consisting of Al, Cu, Cr and Co-salts.

8. The process of claim 1 further comprising the step of adding a mineral pigmenting substance to said first mixture.

9. The process of claim 8 wherein the mineral substance is selected from the group consisting of spinel, lapis lazuli, malachite, rhodonite and turquoise.

10. The process of claim 1 further comprising the step of adding a variation mixture containing pigmenting agents.

11. The process of claim 10 wherein said variation mixture contains a hydrating agent which supports or effects the hydrating of said first mixture.

12. The process of claim 10 further comprising the step of adding a metal pigmenting salt to said variation mixture.

13. The process of claim 12 wherein the metal salt is selected from the group consisting of Al, Fe, Cu, Cr and Co-salts.

14. The process of claim 10 further comprising the step of adding a mineral pigmenting substance to said variation mixture.

15. The process of claim 14 wherein the mineral substance is selected from the group consisting of spinel, lapis lazuli, malachite, rhodonite and turquoise.

16. The process of claim 10 wherein said variation mixture is prepared from one or more premixes.

17. The process of claim 16 wherein said premixes have an acid or basic component or are admixed to premixes with acid or basic components.

18. The process of claim 17 wherein said acid or basic component is phosphoric acid or boric acid or a hydroxide or a carbonate.

19. The process of claim 16 further comprising the step of adding a metal pigmenting salt to one or more of said premixes.

20. The process of claim 19, wherein the metal salt is selected from the group consisting of Al, Fe, Cu, Cr and Co-salts.

21. The process of claim 16 further comprising the step of adding a mineral pigmenting substance to one or more of said premixes.

22. The process of claim wherein the mineral substance is selected from the group consisting of spinel, lapis lazuli, malachite, rhodonite and turquoise.

23. The process of claim 10 further comprising the step of adding an acid during additions resulting in a coloring of the component.

24. The process of claim 1 wherein said first hydrating agent or said second hydrating agent are selected from the group consisting of hydroxides and carbonates.

25. The process of claim 24 wherein said first hydrating agent or said second hydrating agent are selected from the group consisting of K-metasilicate, Na-metasilicate and cement.

26. The process of claim 24 wherein said first hydrating agent or said second hydrating agent are selected from the group consisting of Ca-carbonate, Mg-carbonate, Al-carbonate, Ti-carbonate, Zr-carbonate, their hydrocarbonates and mixtures thereof.

27. The process of claim 24 wherein said first hydrating agent or said second hydrating agent are selected from the group consisting of Ca-hydroxide, Mg-hydroxide, Al-hydroxide, Ti-hydroxide, Zr-hydroxide and mixtures thereof.

28. Process for the production of solid mineral materials from a semifinished product produced by:
   a) mixing together
      i) a filler component containing macroparticles having a size above the colloid limit of the particles in the sol-gel dispersion;
      ii) a reaction component containing an acid component, and
      iii) a buffer component containing sol oxides and poly silicates, to form a first mixture;
   b) forming granulates by adding a first hydrating agent to said first mixture until substantially dry granulates are obtained; and
   c) setting and stabilizing said granulates by mixing said granulates with a second hydrating agent while maintaining an excess of said second hydrating agent to form said stable, reactive semifinished product; and
   d) adding a dispersant to the reactive semifinished product to form said solid mineral material.

29. The process of claim 28 wherein said dispersant is water.

* * * * *

UNITED STATES PATENT AND TRADEMARK OFFICE
CERTIFICATE OF CORRECTION

PATENT NO. : 5,804,154

DATED : September 8, 1998

INVENTOR(S) : Victor Alexander MILLES

It is certified that error appears in the above-identified patent and that said Letters Patent is hereby corrected as shown below:

Claim 5, line 3, "unsoiled" should read --unsolled--.

Claim 22, line 1, "claim wherein" should read --claim 21 wherein--.

Signed and Sealed this

Thirty-first Day of August, 1999

*Attest:*

Q. TODD DICKINSON

*Attesting Officer*     *Acting Commissioner of Patents and Trademarks*